(12) United States Patent
Pedersen

(10) Patent No.: US 9,016,079 B2
(45) Date of Patent: Apr. 28, 2015

(54) ENERGY SYSTEM WITH A HEAT PUMP

(75) Inventor: Troels Gottfried Pedersen, Nivå (DK)

(73) Assignee: HeatF A/S, Herfolge (DK)

( * ) Notice: Subject to any disclaimer, the term of this patent is extended or adjusted under 35 U.S.C. 154(b) by 591 days.

(21) Appl. No.: 13/382,582

(22) PCT Filed: Jul. 8, 2010

(86) PCT No.: PCT/EP2010/059790
§ 371 (c)(1),
(2), (4) Date: Mar. 26, 2012

(87) PCT Pub. No.: WO2010/119142
PCT Pub. Date: Oct. 21, 2010

(65) Prior Publication Data
US 2012/0180511 A1 Jul. 19, 2012

(30) Foreign Application Priority Data
Jul. 8, 2009 (DK) .................................. 2009 70057

(51) Int. Cl.
*F25B 27/00* (2006.01)
*F24D 19/10* (2006.01)
(Continued)

(52) U.S. Cl.
CPC .......... *F24D 19/106* (2013.01); *F24D 11/0221* (2013.01); *F24D 17/0021* (2013.01);
(Continued)

(58) Field of Classification Search
USPC ............... 62/238.7, 238.1, 160; 126/640, 646
See application file for complete search history.

(56) References Cited

U.S. PATENT DOCUMENTS 3,301,002 A * 1/1967 McGrath .......................... 62/175
3,984,050 A * 10/1976 Gustafsson .................... 237/2 B
(Continued)

FOREIGN PATENT DOCUMENTS

CH 634395 1/1983
DE 28 09 425 9/1979
(Continued)

OTHER PUBLICATIONS

U.S. Office Action dated Aug. 1, 2012 for related U.S. Appl. No. 12/310,555.
(Continued)

*Primary Examiner* — Melvin Jones
(74) *Attorney, Agent, or Firm* — Harness, Dickey & Pierce

(57) ABSTRACT

The invention provides a system for collection of thermal energy. The system comprises an energy collector, an energy reservoir, an energy collection medium enclosed in a loop allowing fluid flow of the energy collection medium between the energy collector and the energy reservoir in a forward flow from the energy collector and in a backward flow to the energy collector for transferring energy between the energy collector and the energy reservoir, a collector pump adapted to control a flow rate of the energy collection medium, and a reservoir temperature measuring device being adapted to measure a reservoir temperature of the energy reservoir. Furthermore, the system comprises at least one heat pump comprising a cold side, a warm side, and exchange means for exchange of thermal energy from the cold side to the warm side, the cold and warm sides being arranged to decrease the temperature of the energy collection medium in the backward flow by operation of the heat pump, and a control unit adapted to control the operation of the heat pump and thereby an exchange rate by which thermal energy is exchanged between the energy reservoir and the energy collection medium. The control unit is adapted to control the operation of the heat pump dependent on the measured reservoir temperature.

16 Claims, 3 Drawing Sheets

(51) Int. Cl.
  *F24D 11/02* (2006.01)
  *F24D 17/00* (2006.01)
  *F24D 17/02* (2006.01)
  *F24H 4/04* (2006.01)

(52) U.S. Cl.
  CPC ............ *F24D17/02* (2013.01); *F24D 19/1045* (2013.01); *F24D 19/1078* (2013.01); *F24H 4/04* (2013.01); *Y02B 10/20* (2013.01); *Y02B 10/70* (2013.01); *Y02B 30/12* (2013.01); *Y02B 30/126* (2013.01)

(56) References Cited

U.S. PATENT DOCUMENTS

| | | | |
|---|---|---|---|
| 3,996,759 | A | 12/1976 | Meckler |
| 4,037,650 | A | 7/1977 | Randall |
| 4,044,949 | A | 8/1977 | Morawetz et al. |
| 4,190,199 | A | 2/1980 | Cawley et al. |
| 4,213,563 | A | 7/1980 | van Kuijk |
| 4,256,475 | A | 3/1981 | Schafer |
| 4,270,518 | A | 6/1981 | Bourne |
| 4,291,833 | A | 9/1981 | Franchina |
| 4,309,982 | A | 1/1982 | Oquidam |
| 4,336,692 | A | 6/1982 | Ecker et al. |
| 4,363,218 | A | 12/1982 | Nussbaum |
| 4,378,908 | A | 4/1983 | Wood |
| 4,391,104 | A * | 7/1983 | Wendschlag ............... 62/79 |
| 4,406,136 | A | 9/1983 | Picchiottino |
| 4,413,614 | A | 11/1983 | Lyon et al. |
| 4,438,881 | A | 3/1984 | Pendergrass |
| 4,507,936 | A | 4/1985 | Yoshino |
| 4,507,938 | A | 4/1985 | Hama et al. |
| 4,512,335 | A | 4/1985 | Mori |
| 4,527,618 | A | 7/1985 | Fyfe et al. |
| 4,901,537 | A | 2/1990 | Yoshikawa et al. |
| 5,239,838 | A | 8/1993 | Tressler |
| 5,941,238 | A | 8/1999 | Tracy |
| 6,837,443 | B2 | 1/2005 | Saitoh et al. |
| 7,823,799 | B2 | 11/2010 | Sakai et al. |
| 2007/0151559 | A1 | 7/2007 | Lencastre Godinho |
| 2007/0205298 | A1 | 9/2007 | Harrison et al. |
| 2009/0159076 | A1 | 6/2009 | Zheng |
| 2010/0038441 | A1 | 2/2010 | Pedersen |
| 2012/0043390 | A1 | 2/2012 | Noh et al. |
| 2012/0152232 | A1 | 6/2012 | Pedersen |
| 2012/0180511 | A1 | 7/2012 | Pedersen |

FOREIGN PATENT DOCUMENTS

| | | |
|---|---|---|
| DE | 28 09 425 A1 | 9/1979 |
| DE | 29 45 529 | 5/1981 |
| DE | 30 19 475 | 11/1981 |
| DE | 296 04 530 | 9/1996 |
| DE | 19927027 C1 | 8/2000 |
| DE | 100 21 498 | 11/2000 |
| DE | 10063887 A1 | 6/2002 |
| DE | 202006005592 U1 | 9/2007 |
| EP | 0134184 | 3/1985 |
| EP | 0134184 A2 | 3/1985 |
| FR | 2 263 466 | 10/1975 |
| FR | 2 263 466 A1 | 10/1975 |
| FR | 2 279 038 | 2/1976 |
| FR | 2 505 990 | 11/1982 |
| FR | 2 505 990 A1 | 11/1982 |
| JP | 2004-162983 | 6/2004 |
| WO | WO-2008025850 A2 | 3/2008 |

OTHER PUBLICATIONS

U.S. Office Action dated Mar. 26, 2013 for related U.S. Appl. No. 12/310,555.

Prefiling Search Report dated Jun. 26, 2009 issued by the Danish Patent Office in a related (family member) application, and partial English translation thereof.

Office Action for corresponding U.S. Appl. No. 12/310,555 dated Nov. 28, 2014.

* cited by examiner

ENERGY SYSTEM WITH A HEAT PUMP

FIELD OF THE INVENTION

The present invention relates to a system for collection of thermal energy and a method for operating such a system. The system comprises a heat pump, an energy collector, an energy reservoir, and an energy collection medium.

BACKGROUND OF THE INVENTION

Traditionally, energy collectors such as solar air collectors, solar water collectors, and combinations thereof have been connected to the domestic hot water system, since such energy collectors at the northern hemisphere are most efficient during summer time where the solar radiation and the outdoor temperature are high. At the same time the need for heating of the buildings is very low and sometimes non-existing. During periods with lower solar radiation and/or lower outdoor temperature, the efficiency of energy collectors are lower and their ability to collect an amount of energy which is significant compared to the amount of energy which is needed for production of domestic hot water and/or heating of the building is decreased.

SUMMARY OF THE INVENTION

It is an object of embodiments of the invention to provide an improved system for collection of thermal energy and an improved method of operating such a system.

Thus, in a first aspect, the invention provides a system for collection of thermal energy, the system comprising
- an energy collector,
- an energy reservoir,
- an energy collection medium enclosed in a loop allowing fluid flow of the energy collection medium between the energy collector and the energy reservoir in a forward flow from the energy collector and in a backward flow to the energy collector for transferring energy between the energy collector and the energy reservoir,
- a collector pump adapted to control a flow rate of the energy collection medium,
- a reservoir temperature measuring device being adapted to measure a reservoir temperature of the energy reservoir,
- at least one heat pump comprising a cold side, a warm side, and exchange means for exchange of thermal energy from the cold side to the warm side, the cold and warm sides being arranged to decrease the temperature of the energy collection medium in the backward flow by operation of the heat pump, and
- a control unit adapted to control the operation of the heat pump and thereby an exchange rate by which thermal energy is exchanged between the energy reservoir and the energy collection medium, wherein the control unit is adapted to control the operation of the heat pump dependent on the measured reservoir temperature.

By decreasing the temperature of the energy collection medium in the backward flow it may be possible to decrease the mean temperature inside the energy collector and thereby increase the temperature gradient over the energy collector and thus increase the efficiency of the system. By increased efficiency of the system is understood, that the energy transfer from the energy collection medium to the energy reservoir relative to the incoming energy on the energy collector is increased.

To increase the efficiency the system even more, the energy consumption of the collector pump and/or the heat pump may be controlled dependent on the actual ability of the energy collector to collect energy, thereby optimising the energy consumption of the heat pump and the collector pump relative to the energy collected in the collector and transferred to the energy reservoir.

The energy reservoir may be a water reservoir with domestic hot water, a reservoir with water for heating the building, or a combined reservoir from which a part of the water is used as domestic hot water and another part is used for heating the building. In the latter embodiment, the reservoir may be divided into two separate reservoirs in order to be able to circulate the water for heating without mixing it with the domestic hot water. The two separate reservoirs may thus be in thermal contact with each other, e.g. by arranging one of the reservoirs inside the other reservoir.

In embodiments where the energy reservoir is divided into two separate reservoir, only the first one of them need to be in thermal communication with the energy collection medium as the second one instead may be in thermal communication with the first one via the heat pump.

Both the first and second energy reservoir may be water reservoirs. However, in an alternative embodiment, the second reservoir may e.g. be a salt reservoir, a radiator, a water based floor heating system, or a solid reservoir e.g. in the form of a construction part, such as a floor or a wall.

The system comprises a reservoir temperature measuring device which is adapted to measure the temperature of the energy reservoir, i.e. the temperature of the content of the reservoir, e.g. water, at at least one specific point in the reservoir. The temperature of the content of the energy reservoir may be different when measured at different levels in the reservoir, i.e. being warmer closer to the top of the energy reservoir than when measured closer to the bottom of the reservoir. Dependent on the layout of the system, the reservoir temperature measuring device may be adapted to measure the temperature at one point in the reservoir or at a number of chosen points which each may represent the temperature at a specific level in the energy reservoir.

The energy collector may comprise an inlet and an outlet for the energy collection medium to be able to circulate the energy collection medium between the energy collector and the energy reservoir. The inlet and outlet may be connected to each other by a set of pipes so that the energy collector, the inlet and the outlet together with the pipes form a closed loop being in thermal communication with the energy reservoir. In an alternative embodiment, the energy collection medium may be in direct contact with the energy reservoir. Thus, the loop may comprise the energy collector, a forward flow path, the energy reservoir, and a backward flow path. The energy collector may be connected to the forward flow path via the outlet and connected to the backward flow path via the inlet. As described, the energy reservoir may directly be part of the loop as the energy collection medium may be in contact with the energy collection medium. Alternatively, the energy reservoir indirectly forms part of the loop as the energy collection medium may be enclosed, e.g. in a pipe, when being in thermal communication with the energy reservoir.

The energy collector may be a solar air collector, or a solar water collector. By a solar air collector is in this connection understood, an element in which air is heated by solar energy when air is circulated through the element. Likewise is a solar water collector an element in which water or another suitable liquid medium is heated by solar energy when the liquid medium is circulated there through. As an example, traditional solar collectors comprising plates between which water or air may be heated can be used in the present invention.

Furthermore, vacuum solar collectors may be used. As a further example, a concave mirror may be used together with a set of pipes. Alternatively, the energy collector may collect energy from e.g. see water, the ground, from burning of oil, gas, wood, or waste, or from putrefaction e.g. in connection with composting thereby heating the energy collection medium which may be e.g. a liquid or air. The different types of energy collectors may be combined, so that at least some of them are used simultaneously or alternating e.g. dependent on the weather conditions and/or the energy consumption from the energy reservoir and/or the energy consumption of the collector pump and/or heat pump.

The energy collector may comprise an absorber in order to enhance the collection of solar energy, and thereby heating of the energy collection medium. The absorber may comprise a photovoltaic panel which may produce electricity based on incident solar radiation on the panel. The photovoltaic panel may be coupled to the heat pump and/or the collector pump to supply electricity to at least one of the heat pump and the collector pump. In some embodiments, the photovoltaic panel may be of a size which is large enough to fully cover the need for electricity of at least one of the heat pump and the collector pump.

The collector pump may be a traditional liquid pump, e.g. an impeller pump, a membrane pump, or any similar traditional pump known in the art, thus allowing for circulation of an energy collection medium in the form of e.g. water. As the collector pump is adapted to control the flow rate of the energy collection medium, the collector pump may change the flow rate dependent on one or more chosen parameters such as a measured temperature of e.g. the energy collection medium or the energy reservoir, time of day, solar incident, or other parameters which influence the collection of thermal energy.

In case of a solar air collector using air as energy collection medium, the collector pump may be a fan allowing for circulation of air.

The energy collection medium may be air or a liquid medium such as water depending on the energy collector chosen. In alternative embodiments, a combination of air and a liquid medium may be used. Thus, it may in one embodiment be possible to combine air and water as energy collection medium, thereby applying two energy collection media in the system. The energy collector may in this embodiment be a combined solar air and water collector. Alternatively, two separate energy collectors may be applied, one being a solar air collector and one being a solar water collector. It may in one embodiment be possible to switch between the two energy collection media and/or the two energy collectors e.g. dependent on the need of energy.

It should be understood, that the use of a liquid medium such as water as energy collection medium may require adding of an anti-freeze solution to the liquid medium in order to prevent freezing of the energy collection medium and thereby prevent damaging of the energy collector. Therefore, water as an energy collection medium may in this connection comprise water including an anti-freeze solution. An example of a suitable anti-freeze solution may be glycol. Furthermore, for the described embodiments comprising water as an energy collection medium, the energy collection medium may likewise be another liquid medium where water with or without an anti-freeze solution is meant as an example.

When the energy collection medium is circulated between the energy reservoir and the energy collector and through the energy collector, it may be heated due to incident solar radiation on the energy collector and due to the temperature difference between the energy collection medium, e.g. water, and the energy collector. The heated energy collection medium is circulated back to the energy reservoir leading to a temperature increase of the water in the energy reservoir.

Thus, the energy collector may be coupled to the energy reservoir so that thermal energy can be transferred from the energy collector to the energy reservoir by circulation of the energy collection medium.

In one embodiment, the water in the energy reservoir, e.g. water for heating a building, may be circulated through the energy collector, in which case the energy collection medium is a part of the water in the energy reservoir.

The heat pump comprises a cold side, a warm side, and exchange means for exchange of thermal energy from the cold side to the warm side. The cold and warm sides are arranged to decrease the temperature of the energy collection medium in the backward flow by operation of the heat pump. By exchange of thermal energy from the cold side to the warm side is in this connection understood, that the temperature of the cold side is decreased while the temperature of the warm side is increased. By decreasing the temperature of the cold side energy transfer from the energy collection medium to the energy reservoir is facilitated due to the increased temperature difference between the energy collection medium and the energy reservoir.

The cold side may be arranged in the lower part of the energy reservoir, while the warm side may be arranged above the cold side also in the energy reservoir, whereby exchange of thermal energy from the cold side to the warm side increases the temperature difference between the upper and lower part of the energy reservoir.

However, the warm side may alternatively be arranged in a second reservoir, whereby exchange of thermal energy from the cold side to the warm side increases the temperature difference between the first reservoir where the cold side is arranged and second reservoir where the warm side is arrange.

The second reservoir may be a water reservoir as the first energy reservoir. However, in an alternative embodiment the second reservoir may be e.g. a salt reservoir, a radiator, or a solid reservoir e.g. in the form of a construction part, such as a floor or a wall. An advantage of using a construction part instead of a water reservoir is that the heat capacity of the construction part may be much larger than the heat capacity of water in the second energy reservoir.

In a further alternative, the cold side may be arranged outside the energy reservoir in thermal communication with the forward and backward flow so that the heat exchanger can collect thermal energy from the energy collection medium before the energy collection medium enters the energy reservoir. Thereby the cold side cools the energy collection medium, and thus allows for an increased performance of the energy collector as the mean temperature inside the energy collector is decreased.

When arranging the cold and warm sides so that the temperature of the energy collection medium is decreased in the backward flow by operation of the heat pump, the energy collection medium returns to the energy collector at a lower temperature, thus allowing for an improved efficiency of the energy collector. The temperature decrease may take place in the forward flow path, the backward flow path, and/or in the energy reservoir.

In one embodiment, the system is arranged so that transfer of energy between the energy collector and the energy reservoir primarily takes place at the bottom part of the energy reservoir, as the loop allowing fluid flow of the energy collection medium between the energy collector and the energy reservoir may comprise a set of pipes connecting the energy collector with the lower part of the energy reservoir. This allows for taking advantage of the natural temperature difference in the energy reservoir, as transfer of energy form the energy collector to the energy reservoir via the energy collection medium is facilitated at a lower temperature.

When the heat pump furthermore decreases the temperature of the energy collection medium in the backward flow, the efficiency of the system is increased as the temperature gradient over the energy collector is increased.

A control unit is adapted to control operation of the heat pump and thereby an exchange rate by which thermal energy is exchanged between the energy reservoir and the energy collection medium. Consequently, the control unit may be adapted to start and stop the heat pump and/or to lower and raise the output of the heat pump. Operation of the heat pump is dependent on the measured reservoir temperature. However, other parameters may also influence operation of the pump.

The control unit may further be adapted to control the operation of the heat pump independent on control of the collector pump, thereby allowing for start, stop, and/or change of output of the heat pump without changing the flow rate of the energy collection medium.

The control unit may control both the collector pump and heat pump thereby facilitating installation of the system, as the system may be one unit. Furthermore, the control unit may be responsible for a common power supply to the collector pump and the heat pump. This may have the advantage, that close down of the whole system is facilitated in case of e.g. power blackout.

In one embodiment, the reservoir temperature may be measured in the lower part of the reservoir, e.g. in the area where the energy is transferred from the energy collector to the energy reservoir via the energy collection medium. If the reservoir temperature is high it may be an advantage to lower the reservoir temperature to facilitate energy being transferred from the energy collector to the energy reservoir. This may be done by starting the heat pump to exchange heat from the cold side to the warm side, the cold side being positioned in the lower part of the energy reservoir and the warm side being positioned at the upper part of the energy reservoir or at least above the cold side, whereby the temperature gradient of the energy reservoir is increased. Consequently, the control unit may be adapted to start the heat pump when the reservoir temperature exceeds a predefined value, $T_{start}$. It should be understood, that the reservoir temperature may not only be measured in the lower part of the reservoir, but also at other positions in the reservoir.

In one embodiment, $T_{start}$ is in the range of 5-30 degrees Celsius. The temperature may be chosen based on the capacity of the heat pump, minimisation of heat loss from the energy reservoir, bacterial vegetation at high temperatures, etc. $T_{start}$ need not be a constant temperature, as the system may comprise e.g. two different configurations, such as a summer configuration and a winter configuration in which configurations $T_{start, summer}$ may be different from $T_{start, winter}$. Changing from the winter configuration to the summer configuration may be carried out manually or automatically, e.g. at a specific date every year.

If the temperature of the energy reservoir is below a predefined value, energy may be transferred from the energy collector to the energy reservoir via the energy collection medium without increasing the temperature difference, and it may therefore be an advantage to stop the heat pump and thereby save energy, as the heat pump uses energy when turned on. Consequently, the control unit may be adapted to stop the heat pump when the reservoir temperature is below a predefined value, $T_{stop}$. In one embodiment, $T_{stop}$ is in the range of −5 to 15 degrees Celsius. $T_{stop}$ may be changed manually or automatically like $T_{start}$.

In one embodiment, the control unit is adapted to adjust at least one of $T_{start}$ and $T_{stop}$ in accordance with a set of data, whereby $T_{start}$ and/or $T_{stop}$ may be changed during operation of the system in accordance a chosen set of data.

The set of data may represent forecast of outdoor temperature and/or forecast of solar radiation, as the outdoor temperature and the solar incident on the energy collector influence the amount of energy which may be collected by the energy collector and thereby transferred to the energy reservoir via the energy collection medium. In one embodiment, the control unit may adjust at least one of $T_{start}$ and $T_{stop}$ in accordance with the forecast values. However, adjustment of $T_{start}$ and $T_{stop}$ may subsequently be carried out during operation of the system if the actual weather data differ from the forecast.

The control unit may e.g. be connected to a wireless network to receive a set of data in the form of weather data.

The set of data may alternatively or additionally represent a reservoir temperature being measured in the energy reservoir. Dependent on the layout of the system, the reservoir temperature may be measured at one point in the reservoir or at a number of chosen points which each may represent the temperature at a specific level in the energy reservoir.

If the temperature of the reservoir is measured at an upper level in the energy reservoir where water may be tapped for e.g. heating or domestic hot water, the measured temperature may indicate the level of consumption of water from the reservoir. It may be possible to adjust $T_{start}$ dependent of this measured temperature. If the measured reservoir temperature is low due to a high consumption of heat, $T_{start}$ may be lowered to increase the energy transfer from the energy collector and still maintain a reasonable COP (Coefficient of Performance) of the heat pump.

If a predicted pattern of consumption forecasts a coming high level of consumption of heat from the reservoir, the heat pump may stay turned on even though the reservoir temperature in the upper level of the energy reservoir is high in order to store a sufficient amount of heat in the energy reservoir. The predicted pattern of consumption may consequently be used a set of data in accordance with which at least one of $T_{start}$ and $T_{stop}$ may be adjusted.

The set of data may represent solar incident being measured at the energy collector. The solar incident may be measured by use of a light sensor.

The set of data may furthermore represent an outdoor temperature being measured outside the energy collector. The outdoor temperature may be measured close to the energy collector or at a place which is considered to have a temperature being representative for the outdoor temperature close to the energy collector.

It should be understood, that the above mentioned set of data only represents some of the possible data sets. Other sets may also be applicable. Furthermore, the sets of data may also be combined so that data from one set of data is combined with another set of data allowing for a different set of data to be used. The set of data chosen may change e.g. during the day or during the season e.g. in response to change of weather or in response to energy consumption from the energy reservoir.

The control unit may be adapted to adjust at least one of $T_{start}$ and $T_{stop}$ in accordance with a temperature measured in the warm side.

The control unit may be adapted to adjust at least one of $T_{start}$ and $T_{stop}$ continuously. This may be based on the above mentioned set of data or on experience, such as a use pattern.

Furthermore, the cost of electricity for running the heat pump may also influence the adjustment of least one of $T_{start}$ and $T_{stop}$. By continuously is in the connection meant, that least one of $T_{start}$ and $T_{stop}$ is adjusted according to a chosen time schedule, e.g. every 5 minutes, every hour, every third hour, every 12 hour, or at another time interval. However, the interval may be changed during operation, e.g. dependent of temperature, solar incident, use pattern, etc.

When adjusting at least one of $T_{start}$ and $T_{stop}$ continuously, the primary requirement may be to achieve an optimal energy output, i.e. to optimise the use of energy of the heat pump and the collector pump relative to the energy collected in the collector and transferred to the energy reservoir.

In one embodiment, the heat pump may be a two-phase gas cooling type. The heat pump may comprise a compressor for compression of a refrigerant, and the compressor may have a variable compressor speed. Consequently, the heat pump may operate at different speed levels between an applicable set of $T_{start}$ and $T_{stop}$. The compressor speed may be dependent on a change of the reservoir temperature, e.g. be dependent on the speed at which the reservoir temperature changes.

Furthermore, the control unit may be adapted to reduce the number of compressor starts and stops by reducing the RPM, e.g. until a constant temperature of the energy collection medium in the backward flow to the energy collector can be obtained.

The gas may be R134 or another traditional coolant. Alternatively, $CO_2$ may be used as coolant. $CO_2$ is an environmentally-friendly coolant which further allows the heat pump to work more efficient in a temperature range at a higher level, e.g. 15-80 degrees Celsius, which may be an advantage in this connection.

Alternatively, the heat pump may e.g. be of a Peltier type, an absorption type, or a one-phase gas system based e.g. on a Stirling energy cycle.

The system may further comprise a collector temperature measuring device being adapted to measure a collector temperature of the energy collector. And the control unit may be adapted to calculate a temperature difference $\Delta T$ between the collector temperature and the reservoir temperature and may be adapted to control the operation of the heat pump dependent of said temperature difference, $\Delta T$.

A high temperature difference $\Delta T$ may be due to high solar incident to the energy collector allowing for a high temperature of the energy collector, whereby the energy collection medium is heated to a high temperature. It may therefore not be necessary to turn on the heat pump, as transfer of energy from the energy collector to the energy reservoir may not be facilitated significantly by use of the heat pump compared to the energy used by the heat pump.

During periods with loss of current, the collector temperature may be very high as the energy transfer from the energy collector to the energy reservoir may be decreased. The may be due to the fact that the collector pump does not run during power blackouts. Furthermore, the temperature decrease of the energy collection medium may be limited as the heat pump also stops during power blackouts. When the electricity supply is back again, the energy collection medium may be very hot due to the high collector temperature. As a too high temperature of the energy collection medium may damage the heat pump, it may be preferred that the that the volume of the energy collector may be less than ⅕ of the volume of the energy reservoir thereby protecting the heat pump from too high temperatures.

In particular, the heat capacity of the energy collection medium in the energy collector may be ⅕ of the heat capacity of the medium in the energy reservoir.

Furthermore, the control unit may control the heat pump based on a temperature measured adjacent to the energy collector and a calculation of a dew point temperature of the energy collector. Thereby it may be ensured, that the system is operated above the dew point temperature so that moisture can be avoided. As moisture need not be a problem, this may be of particular relevance if draining of moisture and liquid is difficult or even impossible.

By calculation of the dew point temperature should be understood, that the control unit calculates the dew point temperature in response to a measured temperature. In an alternative embodiment, calculation is done by interpolating between values already calculated and stored in the control unit.

In a second aspect, the invention provides a method for operating a system for collection of thermal energy, the method comprising step of:

collecting energy by use of an energy collector, transferring energy from the energy collector to an energy reservoir by use of a flow of an energy collection medium in a loop between the energy collector and the energy reservoir, controlling the transfer of energy between the energy collector to an energy reservoir by controlling a collector pump adapted to provide flow of the energy collection medium, exchanging thermal energy between the energy reservoir and the energy collection medium by operation of at least one heat pump which comprises a cold side, a warm side, and exchange means for exchange of thermal energy from the cold side to the warm side, and controlling the operation of the heat pump dependent on a measurement of a temperature of the energy reservoir.

In a third aspect, the invention provides a method for operating a system for collection of thermal energy, the method comprising step of:

collecting energy by use of an energy collector, transferring energy from the energy collector to an energy reservoir by use of a flow of an energy collection medium in a loop between the energy collector and the energy reservoir, controlling the transfer of energy between the energy collector to an energy reservoir by controlling a collector pump adapted to provide flow of the energy collection medium, exchanging thermal energy between the energy reservoir and the energy collection medium by operation of at least one heat pump which comprises a cold side, a warm side, and exchange means for exchange of thermal energy from the cold side to the warm side, and controlling the operation of the heat pump independent on the control of the collector pump.

It should be understood, that any of the above-mentioned features of the first aspect of the invention may also be applicable to the method of the second and third aspects of the invention.

EXAMPLES

Examples of different control strategies for the heat pump and the system as a whole will be further described below. It should be understood, that the below examples are illustration of embodiments of the invention only, and that the invention is not limited hereto.

Example 1

The energy reservoir is in this example used for heating of a house. One requirement it to limit the use of a supplementary heat source, e.g. gas, oil, or electricity. Another requirement is to limit the use of the heat pump, and if use is necessary, the heat pump should be used under the most favourably conditions which dependent on whether if it is summer or winter and consequently of the amount of energy needed. If the heat consumption is low, e.g. during a summer night or an autumn night, it is profitable leaving the heat pump shut down and having the supplementary heat source heat the energy reservoir. When the sun raises and the outdoor temperature increases, the temperature of the energy collector will raise due to incoming solar incident and the raising outdoor temperature. Thus, the control of the heat pump is dependent on the time of the day and the time of the year.

If the weather forecast does not forecast a sunny day, the control unit is set up to ensure that the heat pump facilitates transfer of as much energy as possible from the energy collector to the energy reservoir by running the heat pump so that the reservoir temperature of the water in the lower part of the energy reservoir is kept just above or just below the outdoor temperature, such as in a range of ±5 degrees Celsius. Thereby it is possible to transfer as much energy as possible from the energy collector, as the average temperature of the energy collector is as low as possible relative to the surroundings. This increases the efficiency of the system during cloudy days.

If the heat consumption is high, the heat pump may not alone be able to cover the energy consumption together with the energy collector, and the supplementary heat source may cover the rest. However, it can happen that the reservoir temperature in the upper part of the energy reservoir becomes very warm anyway, e.g. 60 degrees Celsius, due to a lowered heat consumption, e.g. if a wood-burning stove is turned on. In such a case the heat pump will have to operate between the low temperature at the lower part of the energy reservoir and the high temperature at the upper part of energy reservoir, e.g. at a temperature difference of about 55 degrees, by which the COP of the heat pump drops significantly. And consequently, the transfer of energy from the bottom of the energy reservoir to the top of the reservoir becomes expensive. It will thus be more economically efficient to raise the temperature in the lower part of the energy reservoir to e.g. 15 degrees, even though that the lowers the efficiency of the energy collector, as this will result in a reasonable COP of the heat pump and make it cheaper in use than use of the supplementary heat source. Thus, the control of the heat pump can be dependent on the COP of the heat pump.

During a partly overcast day, it may be feasible to raise the temperature in the lower part of the energy reservoir to 25 degrees Celsius, as the COP of the heat pump is still reasonably.

If the heat consumption suddenly raises the control unit can control the heat pump to decrease the temperature in the lower part of the energy reservoir to transfer more energy from the energy collector to the energy reservoir. As long as the COP of the heat pump is reasonable, and as long as the heat pump is cheaper in use than the supplementary heat source, this solution is preferred.

Example 2

On a cold sunny day, where the outdoor temperature is e.g. 5 degrees Celsius, it is possible to collect solar energy at one time of the day and store it to later. Dependent on the heat consumption and the size and position of the energy collector, the reservoir temperature may raise to 60 degrees Celsius during half of the day. Thereafter, the solar incident lowers due to the incident angle on the energy collector, and the reservoir temperature cannot be raised to above 60 degrees Celsius by the energy collector. If the heat pump is switch on, it is however possible to raise the reservoir temperature at the upper part of the reservoir to e.g. 80 degrees Celsius while lowering the temperature at the bottom part of the reservoir to e.g. 30 degrees Celsius. Control of the heat pump can be set up to be dependent on the time of the day.

Example 3

If the system is used in connection with heating of domestic hot water, the control strategies for the heat pump can be different, as it may be controlled under consideration of bacterial growth. As bacterial growth is primary in lukewarm water, the heat pump can be used to limit bacterial growth as much as possible by decreasing the temperature at the bottom part of the energy reservoir and heating the upper part of the energy reservoir, e.g. to above 55 degrees Celsius.

Dependent on the cleanness of the domestic water, it may only be necessary to turn on the heat pump occasionally to raise the temperature at the upper part of the energy reservoir. Consequently, the solar energy and the heat pump can ensure that the temperature in the upper part of the energy reservoir is about 40-45 degrees Celsius during the summer thereby optimising the use of solar energy and minimising the use of electricity required to run the heat pump. At certain days where the conditions are right, e.g. at partly overcast days with low consumption of water from the energy reservoir, the heat pump can be controlled to heat the upper part of the energy reservoir to above 55 degrees Celsius.

Example 4

In this example, the energy reservoir is very big and energy is transferred hereto without raising the reservoir temperature very much. The energy reservoir can be coupled to a second reservoir which may be smaller and from which domestic hot water can be tapped. To minimise the costs associated with running of the heat pump, the heat pump can be turned on when the energy costs are low, e.g. during night time, to heat the water in the second reservoir to a sufficient temperature level or until the temperature of the energy reservoir is so low that running of the heat pump is no longer profitable. In some cases, running of the heat pump can continue until brash ice occurs in the energy reservoir to transfer an even large amount of energy. To avoid freezing of the energy reservoir, stirring can take place in the reservoir.

BRIEF DESCRIPTION OF THE DRAWINGS

Embodiments of the invention will now be further described with reference to the drawings, in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
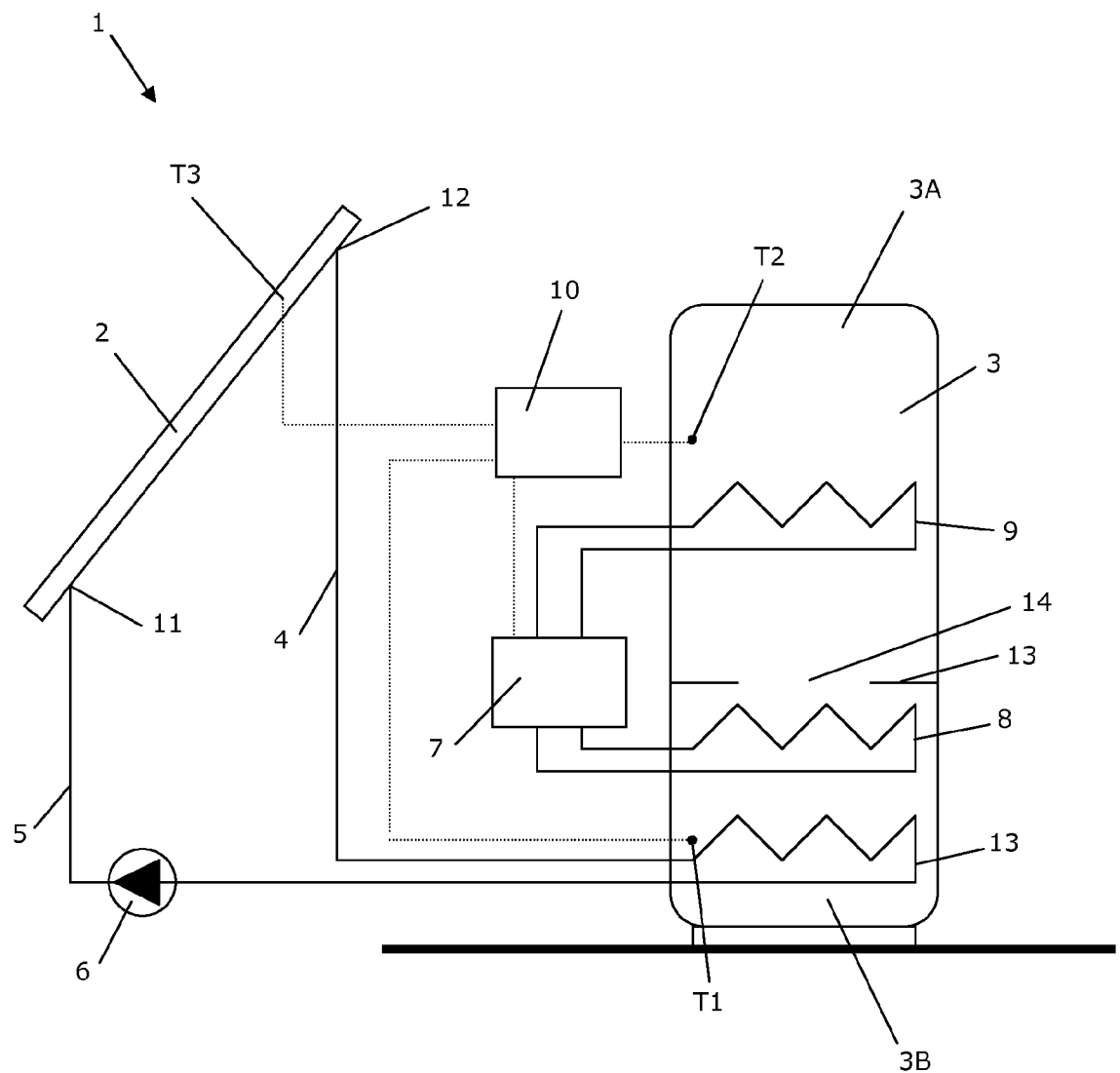
FIGS. 1, 2 and 3 illustrate different embodiments of a system for collecting thermal energy according to the invention.

FIG. 1 illustrates an embodiment of a system 1 for collection of thermal energy. The system 1 comprises an energy collector 2, an energy reservoir 3, and an energy collection medium (not shown) enclosed in a loop allowing fluid flow of the energy collection medium between the energy collector 2 and the energy reservoir 3 in a forward flow 4 from the energy collector 2 and in a backward flow 5 to the energy collector 2 for transferring energy between the energy collector 2 and the energy reservoir 3.

The system 1 further comprises a collector pump 6 which is adapted to control a flow rate of the energy collection medium, and a reservoir temperature measuring device (not shown).

The reservoir temperature measuring device is adapted to measure a reservoir temperature, e.g. T1 or T2, of the energy reservoir 3.

Furthermore, the system 1 comprises at least one heat pump 7 comprising a cold side 8, a warm side 9, and exchange means for exchange of thermal energy from the cold side 8 to the warm side 9. The cold and warm sides 8, 9 are arranged to decrease the temperature of the energy collection medium in the backward flow 5 by operation of the heat pump 7.

The system 1 further comprises a control unit 10 adapted to control the operation of the heat pump 7 and thereby an exchange rate by which thermal energy is exchanged between the energy reservoir 3 and the energy collection medium. The control unit 10 is adapted to control the operation of the heat pump 7 dependent on the measured reservoir temperature, e.g. T1, T2. The dependency is illustrated by the dotted lines between the control unit 10 and the points at which the reservoir temperature T1, T2 is measured.

In the illustrated embodiment, the energy collection medium is a liquid medium is the form of water with an anti-freeze solution. Accordingly, the energy collector 2 is a solar water collector through which the energy collection medium is circulated and thus heated.

It should however, be understood that the solar water collector 2 illustrated in FIG. 1 is an example of an energy collector according to the invention. The energy collector 2 may also be a solar air collector, a vacuum solar collector, a concave mirror used together with a set of pipes. Alternatively, the energy collector may collect energy from e.g. see water, the ground, from burning of oil, gas, wood, or waste, of from putrefaction e.g. in connection with composting.

The energy collector 2 illustrated in FIG. 1 may be combined with one or more of the other examples of energy collectors, so that at least some of them are used simultaneously or alternating e.g. dependent on the weather conditions and/or the energy consumption from the energy reservoir and/or the energy consumption of the collector pump and/or heat pump.

The reservoir temperature measuring device which is adapted to measure the temperature of the energy reservoir 3, i.e. the temperature of the content of the water in the reservoir, at at least one specific point in the reservoir. The temperature of the content of the energy reservoir 3 is different when measured at different levels in the reservoir, i.e. being warmer closer to the top of the energy reservoir than when measured closer to the bottom of the reservoir. In the illustrated embodiment of the system 1, the reservoir temperature measuring device is adapted to measure the temperature close to the bottom of the reservoir T1 and close to the top of the reservoir T2, which temperatures each represent a temperature at a specific level in the energy reservoir 3.

The energy collector 2 comprises an inlet 11 and an outlet 12 for the energy collection medium to be able to circulate the energy collection medium between the energy collector 2 and the energy reservoir 3. The inlet and outlet 11, 12 are connected to each other by a set of pipes 4, 5, 13 so that the energy collector 2, the inlet 11 and the outlet 12 together with the pipes 4, 5, 13 form a closed loop being in thermal communication with the energy reservoir 3.

The energy collector 2 is connected to the forward flow path 4 via the outlet 12 and connected to the backward flow path 5 via the inlet 11. Furthermore, the forward flow path 4 and the backward flow path 5 are connected via a heat exchanger 13 which allows for thermal communication between the energy collection medium and the energy reservoir 3.

When the energy collection medium is circulated between the energy reservoir 3 and the energy collector 2 and through the energy collector 2, it can be heated due to incident solar radiation on the energy collector 2 and due to the temperature difference between the energy collection medium and the energy collector 2. The heated energy collection medium is circulated back to the energy reservoir 3 leading to a temperature increase of the water in the energy reservoir 3.

Thus, the energy collector 2 is coupled to the energy reservoir 3 so that thermal energy can be transferred from the energy collector 2 to the energy reservoir 3 by circulation of the energy collection medium.

The heat pump 7 comprises a cold side 8, a warm side 9, and exchange means for exchange of thermal energy from the cold side to the warm side. The cold and warm sides 8, 9 are arranged to decrease the temperature of the energy collection medium in the backward flow 5 by operation of the heat pump 7. By exchange of thermal energy from the cold side 8 to the warm side 9 is in this connection understood, that the temperature of the cold side 8 is decreased while the temperature of the warm side 9 is increased.

When arranging the cold and warm sides 8, 9 so that the temperature of the energy collection medium is decreased in the backward flow 5 by operation of the heat pump 7, the energy collection medium returns to the energy collector at a lower temperature, which allows for an improved efficiency of the energy collector 2. The temperature decrease takes place in the energy reservoir 3 in the illustrated embodiment. Furthermore, the system 1 is arranged so that transfer of energy between the energy collector 2 and the energy reservoir 3 primarily takes place at the bottom part of the energy reservoir 3, as the heat exchanger 13 is positioned here. This allows for taking advantage of the natural temperature difference in the energy reservoir 3, as transfer of energy form the energy collector 2 to the energy reservoir 3 via the energy collection medium is facilitated at a lower temperature.

As the heat pump 7 furthermore decreases the temperature of the energy collection medium in the backward flow 5, the efficiency of the system 1 is increased as the temperature gradient over the energy collector 2 is increased.

The control unit 10 is adapted to control operation of the heat pump 7 and thereby an exchange rate by which thermal energy is exchanged between the energy reservoir 2 and the energy collection medium. Consequently, the control unit 10 can start and stop the heat pump 7 and/or lower and raise the output of the heat pump 7. Operation of the heat pump 7 is dependent on the measured reservoir temperature, e.g. T1, T2 as illustrated by the dotted lines. However, other parameters also influence operation of the pump.

A collector temperature measuring device (not shown) is adapted to measure a collector temperature T3 of the energy collector 2. The control unit 10 is adapted to calculate a temperature difference ΔT between the collector temperature T3 and the reservoir temperature, e.g. T1, T2, and can control the operation of the heat pump 7 dependent of said temperature difference, ΔT as illustrated by the dotted lines.

To increase the temperature difference between the upper part 3A of the energy reservoir and the bottom part 3B of the energy reservoir, a metal plate 13 is attached to the inner surface of the energy reservoir 3. The plate 13 has an aperture 14 in the centre allowing for the water in the energy reservoir 3 to pass the plate 13. By attaching the plate 13 to the inner surface of the energy reservoir 3, mixing of the water in the energy reservoir 3 is limited, thereby further increasing the reservoir temperature gradient.

Figure 2:
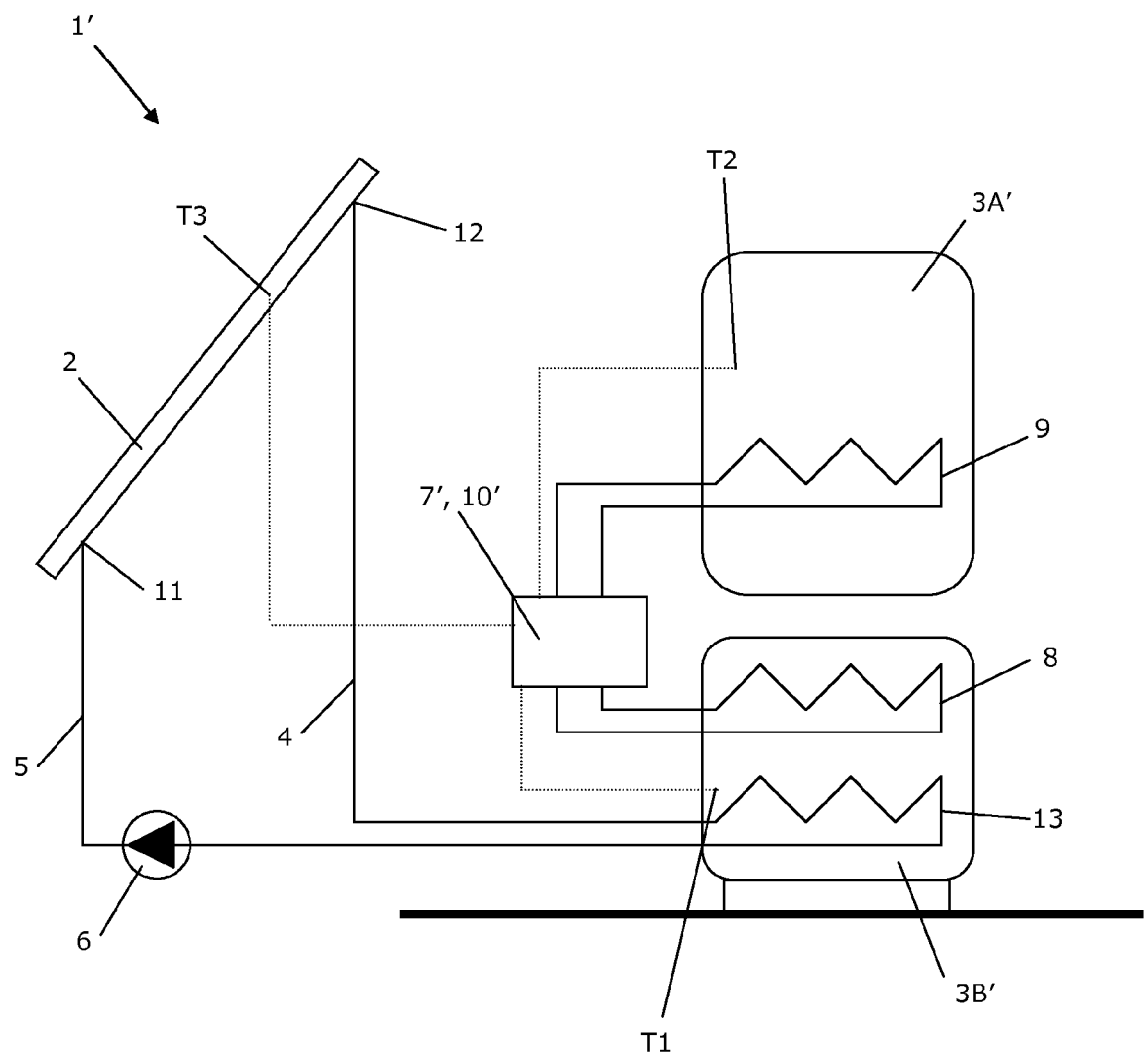

The embodiment of the system 1' illustrated in FIG. 2 is similar to the embodiment 1 illustrated in FIG. 1 except for the fact, that the energy reservoir 3' is divided into two separate energy reservoirs, an upper reservoir 3A' and a bottom reservoir 3B'. Furthermore, the control unit 10' is integrated in the heat pump 7'.

In the illustrated embodiment, both the upper and lower energy reservoirs 3A', 3B' are water reservoirs. However, it should be understood, that the second reservoir in an alternative embodiment could be e.g. a salt reservoir, a radiator, a water based floor heating system, or a solid reservoir e.g. in the form of a construction part, such as a floor or a wall.

Both illustrated embodiments are well suited for use in connection with renovation of elder solar collector systems, as the elder energy reservoir may be replaced with an energy reservoir 3, 3' of the illustrated type inclusive a heat pump 7, 7' and a control unit 10, 10'.

It the energy reservoir 3, 3', the heat pump 7, 7' and the control unit 10, 10' are an integrated unit a simple plug and play solution is provided, thus decreasing the installation cost associated with the renovation as no electrician is needed for installation of an integrated control unit.

Figure 3:
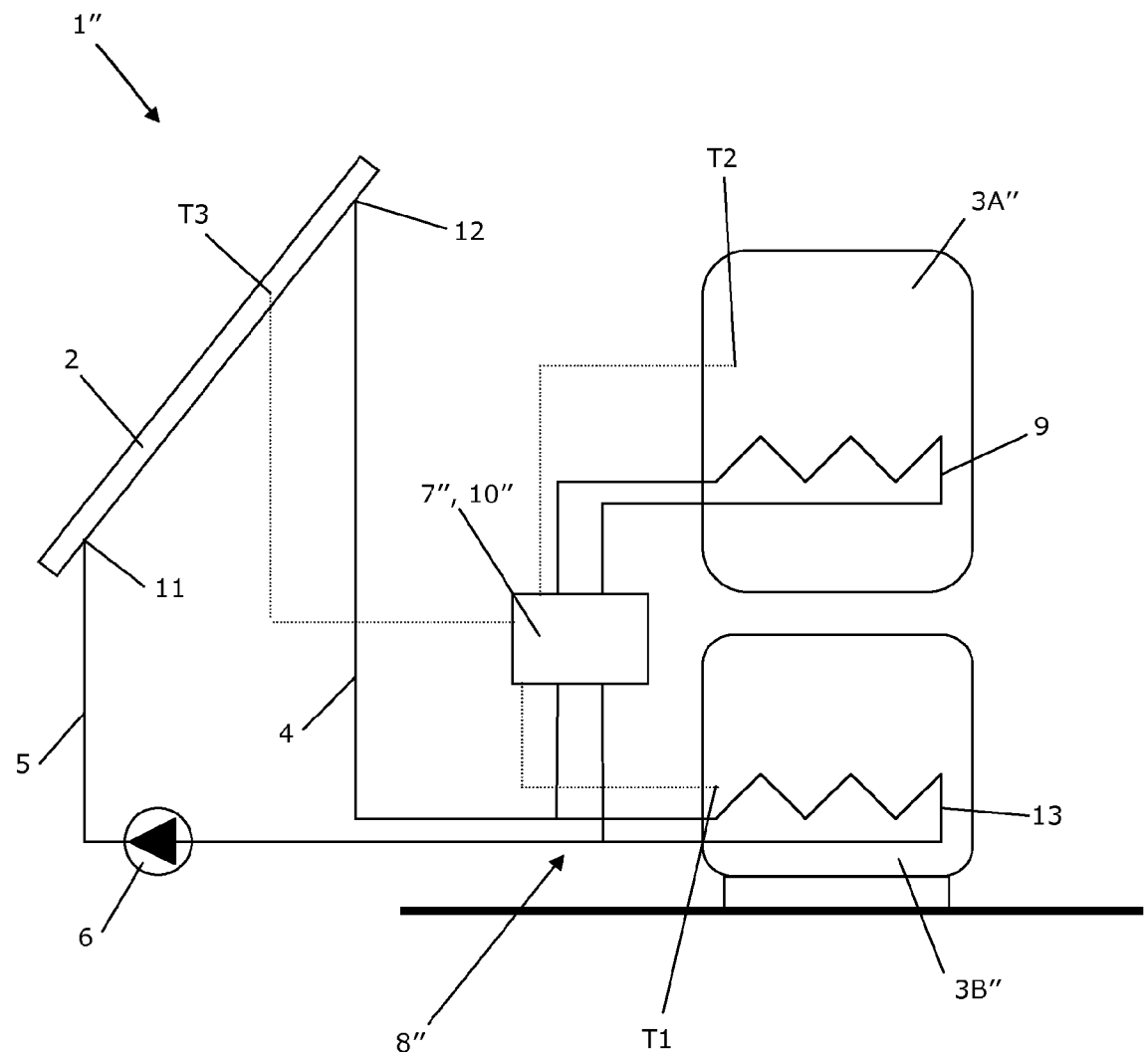

The embodiment of the system 1" illustrated in FIG. 3 is similar to the embodiment 1' illustrated in FIG. 2 except for the fact, the cold side 8" of the heat exchanger 7" is arranged outside the energy reservoir 3B" in thermal communication with the forward and backward flow 4, 5 so that the heat exchanger 7" can collect thermal energy from the energy collection medium before the energy collection medium enters the energy reservoir 3B". Thereby the cold 8" side cools the energy collection medium, and thus allows for an increased performance of the energy collector 2 as the mean temperature inside the energy collector 2 is decreased.

The invention claimed is:

1. A system for collection of thermal energy, the system comprising:
    an energy collector,
    an energy reservoir,
    an energy collection medium enclosed in a loop allowing fluid flow of the energy collection medium between the energy collector and the energy reservoir in a forward flow from the energy collector and in a backward flow to the energy collector for transferring energy between the energy collector and the energy reservoir,
    a collector pump configured to control a flow rate of the energy collection medium dependent on a measured temperature of the energy reservoir,
    a reservoir temperature measuring device configured to measure a reservoir temperature of the energy reservoir,
    at least one heat pump including a cold side, a warm side, and exchange means for an exchange of thermal energy from the cold side to the warm side, the cold and warm sides being arranged to decrease a temperature of the energy collection medium in the backward flow by operation of the at least one heat pump, and
    a control unit configured to control the at least one heat pump and thereby an exchange rate by which thermal energy is exchanged between the energy reservoir and the energy collection medium,
    wherein the control unit is configured to,
    control the at least one heat pump dependent on the measured reservoir temperature, and
    start the at least one heat pump when the reservoir temperature exceeds a predefined value, $T_{start}$.

2. The system according to claim 1, wherein the control unit is configured to control the at least one heat pump independent of controlling the collector pump.

3. The system according to claim 1, wherein the control unit is configured to stop the at least one heat pump when the reservoir temperature is below a predefined value, $T_{stop}$.

4. The system according to claim L wherein the control unit is configured to adjust at least one of $T_{start}$ and $T_{stop}$ in accordance with a set of data.

5. The system according to claim 4, wherein the set of data represents at least one of a forecast of outdoor temperature and a forecast of solar radiation.

6. The system according to claim 4, wherein the set of data represents the reservoir temperature being measured in the energy reservoir.

7. The system according to claim 4, wherein the set of data represents solar incident being measured at the energy collector.

8. The system according to claim 4, wherein the set of data represents an outdoor temperature being measured outside the energy collector.

9. The system according to claim 1 wherein the control unit is configured to adjust at least one of $T_{start}$ and $T_{stop}$ in accordance with a temperature measured in the warm side.

10. The system according to claim 1, wherein the control unit is configured to adjust at least one of $T_{start}$ and $T_{stop}$ continuously.

11. The system according to claim 1, wherein the heat pump comprises:
    a compressor configured to compress a refrigerant, wherein the compressor has a variable compressor speed.

12. The system according to claim 11, wherein the compressor speed is dependent on a change of the reservoir temperature.

13. The system according to claim 1, further comprising:
    a collector temperature measuring device configured to measure a collector temperature of the energy collector, wherein the control unit is configured to,
    calculate a temperature difference ΔT between the collector temperature and the reservoir temperature, and
    control the at least one heat pump dependent on said temperature difference, ΔT.

14. The system according to claim 1, wherein a volume of the energy collector is less than ⅕ of a volume of the energy reservoir.

15. The system according to claim 1, wherein the control unit is configured to control the at least one heat pump based on a temperature measured adjacent to the energy collector and a calculation of a dew point temperature of the energy collector.

16. A method for operating a system for collection of thermal energy, the method comprising:

collecting energy by use of an energy collector, transferring energy from the energy collector to an energy reservoir by use of a flow of an energy collection medium in a loop between the energy collector and the energy reservoir, controlling the transfer of energy between the energy collector to the energy reservoir by controlling a collector pump, the collector pump providing a flow of the energy collection medium, the collector pump being controlled dependent on a measured temperature of the energy reservoir, exchanging thermal energy between the energy reservoir and the energy collection medium by at least one heat pump that includes a cold side, a warm side, and exchange means for an exchange of thermal energy from the cold side to the warm side, and controlling the at least one heat pump dependent on the measured reservoir temperature, wherein the controlling starts the at least one heat pump when the reservoir temperature exceeds a predefined value, $T_{start}$.

* * * * *

UNITED STATES PATENT AND TRADEMARK OFFICE
CERTIFICATE OF CORRECTION

| | |
|---|---|
| PATENT NO. | : 9,016,079 B2 |
| APPLICATION NO. | : 13/382582 |
| DATED | : April 28, 2015 |
| INVENTOR(S) | : Troels Gottfried Pedersen |

It is certified that error appears in the above-identified patent and that said Letters Patent is hereby corrected as shown below:

Claims

Claim 4 should read

4. The system according to claim $\underline{1}$ [[L]], wherein the control unit is configured to stop the at least one heat pump when the reservoir temperature is below a predefined value, Tstop.

Signed and Sealed this
Twentieth Day of October, 2015

Michelle K. Lee
*Director of the United States Patent and Trademark Office*